United States Patent [19]
Nelson

[11] Patent Number: 5,439,241
[45] Date of Patent: Aug. 8, 1995

[54] COLLAPSIBLE GOLF BAG CART WITH SEAT

[75] Inventor: Walter T. Nelson, Grand Rapids, Mich.

[73] Assignee: Pingree Products Ltd., Grand Rapids, Mich.

[21] Appl. No.: 161,593

[22] Filed: Dec. 6, 1993

[51] Int. Cl.⁶ .............................................. B62B 1/12
[52] U.S. Cl. .................... 280/645; 280/652; 280/47.25
[58] Field of Search ......... 280/645, 651, 652, DIG. 5, 280/DIG. 6, 638, 35, 639, 641, 47.131, 47.17, 47.24, 47.25; D34/15; 224/274

[56] References Cited

U.S. PATENT DOCUMENTS

| | | | |
|---|---|---|---|
| D. 302,887 | 8/1989 | Ackerfeldt | D34/15 |
| D. 311,079 | 10/1990 | Blake | D34/15 |
| 2,438,078 | 3/1948 | Sutphen | 280/645 |
| 2,860,888 | 11/1958 | Murcott | 280/645 |
| 3,014,760 | 12/1961 | Gard | 280/645 |
| 3,709,514 | 1/1973 | Kaltmarek | 280/645 |
| 4,262,928 | 4/1981 | Leitzel | 280/645 |
| 4,756,539 | 7/1988 | Sneddon | 280/40 |

Primary Examiner—Richard M. Camby
Attorney, Agent, or Firm—Warner Norcross & Judd

[57] ABSTRACT

A collapsible golf bag cart including a seat and easily moved between collapsed and uncollapsed positions. The cart includes a bag support frame, a wheel support frame and a telescoping seat support frame. These support frames are pivotally secured to one another to allow the cart to collapse and uncollapse in a single motion. The seat support frame has telescoping frame halves which extend or retract as the cart is collapsed and uncollapsed. The bag support frame includes spaced apart side members for receiving a golf club bag therebetween. A seat is hingedly mounted atop the wheel support frame and rests on the seat support frame when the cart is uncollapsed.

19 Claims, 3 Drawing Sheets

COLLAPSIBLE GOLF BAG CART WITH SEAT

BACKGROUND OF THE INVENTION present invention relates to a collapsible golf bag cart having an integral seat.

Golf bag carts are well known and provide an inexpensive way to ease the burden of carrying golf clubs. One such cart is disclosed in U.S. Pat. No. 4,756,539 issued Jul. 12, 1988 to Sneddon, which shows a collapsible cart having a seat. The cart includes pivotally secured members so that it can be easily collapsed. The seat is mounted on a seat support member that pivots between an upright and collapsed position. The golf bag rests on a support member well above the wheels, resulting in a somewhat unstable cart due to a relatively high center of gravity. In addition, the collapsed Sneddon cart remains rather bulky when "collapsed."

Another collapsible golf bag cart is sold under the name "The BRIT" by Geo-Sport of Allenton, Wisc. This cart includes interconnecting frame members that can be disconnected to collapse the cart. As in the Sneddon cart, the Brit is less stable because the golf bag is seated upon a support member well above the wheels. The Brit is relatively difficult to collapse and uncollapse because it requires assembly and disassembly of the cart.

Yet another collapsible golf club cart is disclosed in U.S. Design Pat. No. Des. 302,887 issued Aug. 15, 1989 to Ackerfeldt. The Ackerfeldt cart does not support a golf bag, but only individual golf clubs in specially designed brackets. The Ackerfeldt cart includes a hinged seat mounted on a collapsible frame. A bag hangs from the frame beneath the seat. This cart also is somewhat bulky in its collapsed configuration.

SUMMARY OF THE INVENTION

The aforementioned problems are overcome by the present invention wherein a collapsible golf bag cart is provided having an integral seat. The cart includes bag, wheel, and seat support frames that are pivotally secured to one another such that the cart easily collapses by drawing the support frames together. The cart also includes spaced apart side members that permit the golf bag to be received in a relatively low position to lower the center of gravity and improve the stability of the cart. The seat is hingedly secured to the wheel support frame. In the most preferred embodiment, the wheels of the cart are detachable to provide an even more compact profile when collapsed.

The present invention provides a simple and inexpensive collapsible golf bag cart that folds into a compact profile with a single easy motion. In addition, the cart is extremely stable as a result of a low center of gravity which stems from the golf bag being seated down between the dual spaced apart side members. This unique approach to seating the bag also provides for secure support of the bag without the need for additional attachment devices, such as a bag strap.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
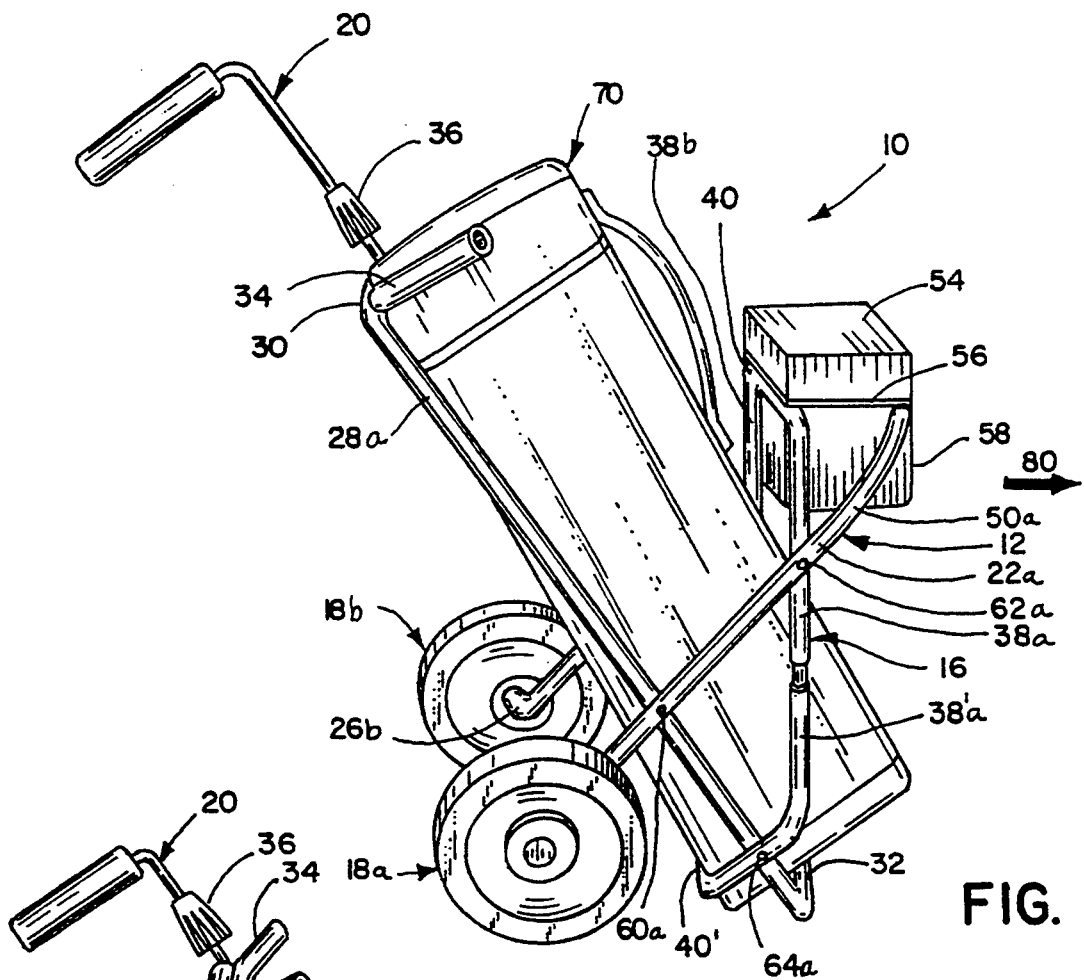
FIG. 1 is a perspective view of the golf bag cart of the present invention supporting a golf club bag.
Figure 2:
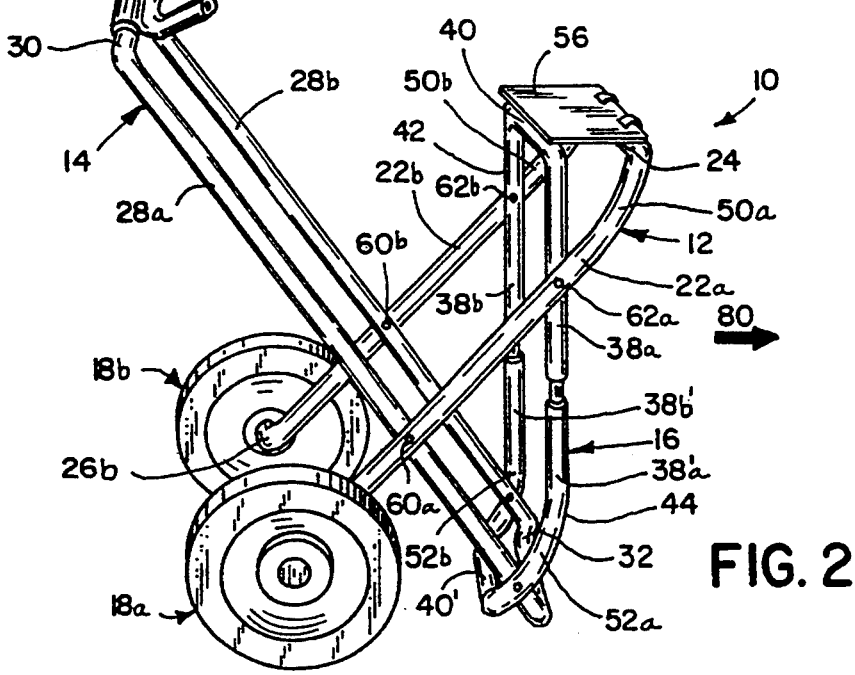
FIG. 2 is a perspective view of the golf bag cart with the golf bag removed and without the seat container.

The golf bag cart of the present invention is illustrated in the drawings and generally designated 10. As perhaps best illustrated in FIGS. 1 and 2, the golf bag cart 10 includes a wheel support frame 12, a bag support frame 14, a seat support frame 16, a pair of wheels 18a–b, and an "L" shaped handle 20. The direction denoted by arrow 80 will be herein referred to as forward.

The wheel support frame 12 is generally "U" shaped and includes a pair of spaced apart side members 22a–b and a bight member 24 extending between the upper ends of the pair of side members 22a–b. A pair of elbows 26a–b extend outwardly from the lower end of each side member 22a–b, respectively (see FIG. 4). The upper portion of side members 22a–b each form a slight rearward bend 50a–b such that the cart 10 lies substantially flat in the collapsed position. A seat 54 is affixed to bight member 24. In a preferred embodiment, the seat 54 includes a hinged lid 56 which opens to provide access to a container 58 suspended below. This container 58 can be fabricated from or lined with an insulating material to maintain the thermal characteristics of items placed therein. In addition, the container 58 can include any number of pouches, trays or other subcompartments for storing golf items such as tees, balls, divot wrenches, pencils, gloves and scorecards.

The bag support frame 14 is generally rectangular and includes a pair of spaced apart side members 28a–b, an upper cross member 30, a lower cross member 32, and a bag-support member 34. Bag support frame side member 28b is hollow and telescopically receives the long leg of the "L" shaped handle 20. A locking nut 36, as is well known in the art, is affixed to the upper end of the bag support frame side member 28b that receives the handle 20. The locking nut 36 defines an aperture through which the long leg of the "L" shaped handle 20 extends and functions to secure the handle 20 in the desired position. The upper 30 and lower 32 cross members extend between the upper and lower ends of the side members 28a–b, respectively. The bag support member 34 is pivotally secured to the upper cross member 30 and pivots between an extended and a collapsed position. In the collapsed position, the bag support member 34 lies substantially flat with (i.e. in the plane of) the bag support frame to provide a compact profile for the collapsed cart 10. The bag support member 34 pivots upward and locks into the extended position to support the upper side wall of the golf club bag 70. The lower cross member 32 supports the bottom of the golf bag 70. In a preferred embodiment, the lower cross member 32 includes an upwardly arching central portion 35 which supports the golf bag 70 well above the ground (See FIG. 4).

Figure 4:
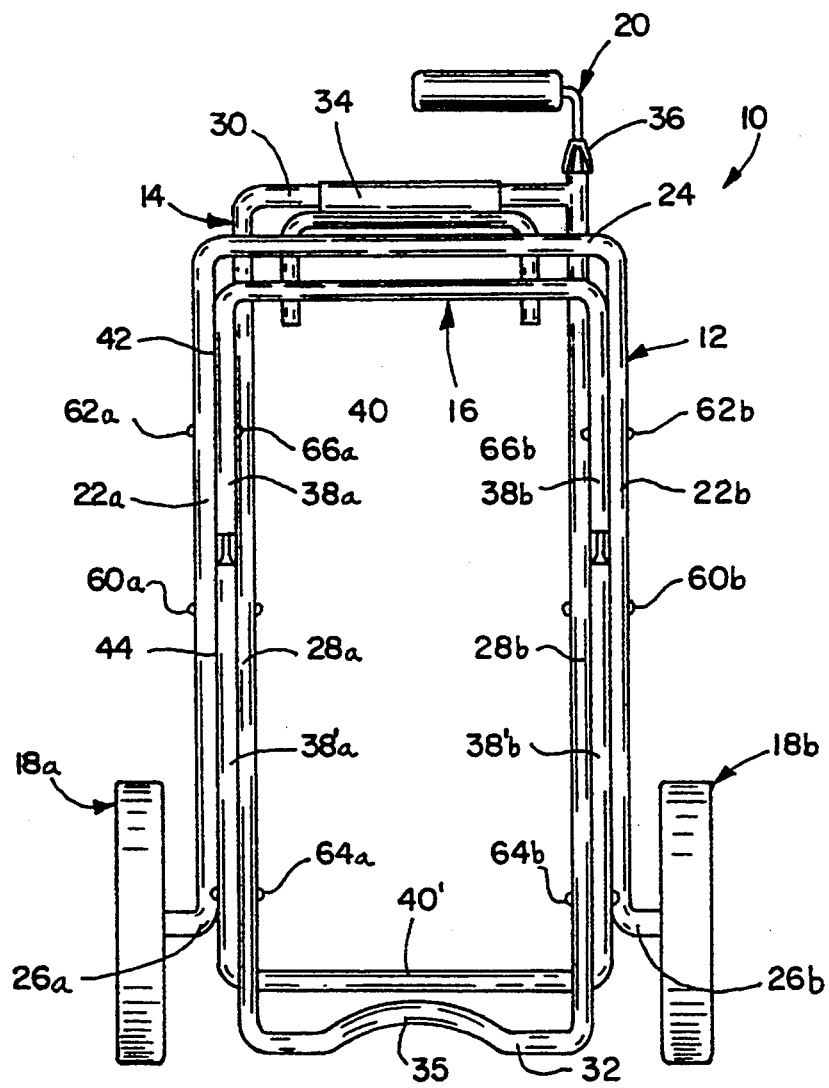
FIG. 4 is a top plan view of the golf bag cart collapsed.

The seat support frame 16 includes an upper "U" shaped member 42 and a lower "U" shaped member 44 which cooperate to allow the seat support frame 16 to extend and retract (see FIG. 4). The upper "U" shaped member 42 include spaced apart side members 38a-b and upper cross member 40 extending across the upper ends of upper side members 38a-b. The lower "U" shaped member 44 includes spaced apart side members 38a'-b' and lower cross member 40' extending across the lower ends of lower side members of 38a'-b'. The upper and lower "U" shaped members 42 and 44 are telescopically received within one another so that the seat support frame 16 extends and retracts as the cart 10 is collapsed and uncollapsed. In the preferred embodiment, the upper side members 38a-b are hollow and the upper portion of the lower side members 38a'-b' are telescopically received within the hollow upper side members 38a-b. The lower portions of bower side members 38a'-b' form a slight rearward bend 52a-b thereby allowing the cart 10 to lie substantially flat in the collapsed position. Lower side members 38a'-b' cooperate with lower cross member 40' to provide a support for the lower side wall of the golf bag 70 (see FIG. 1). Upper cross member 40 supports seat 54 (see FIG. 2).

Figure 5:
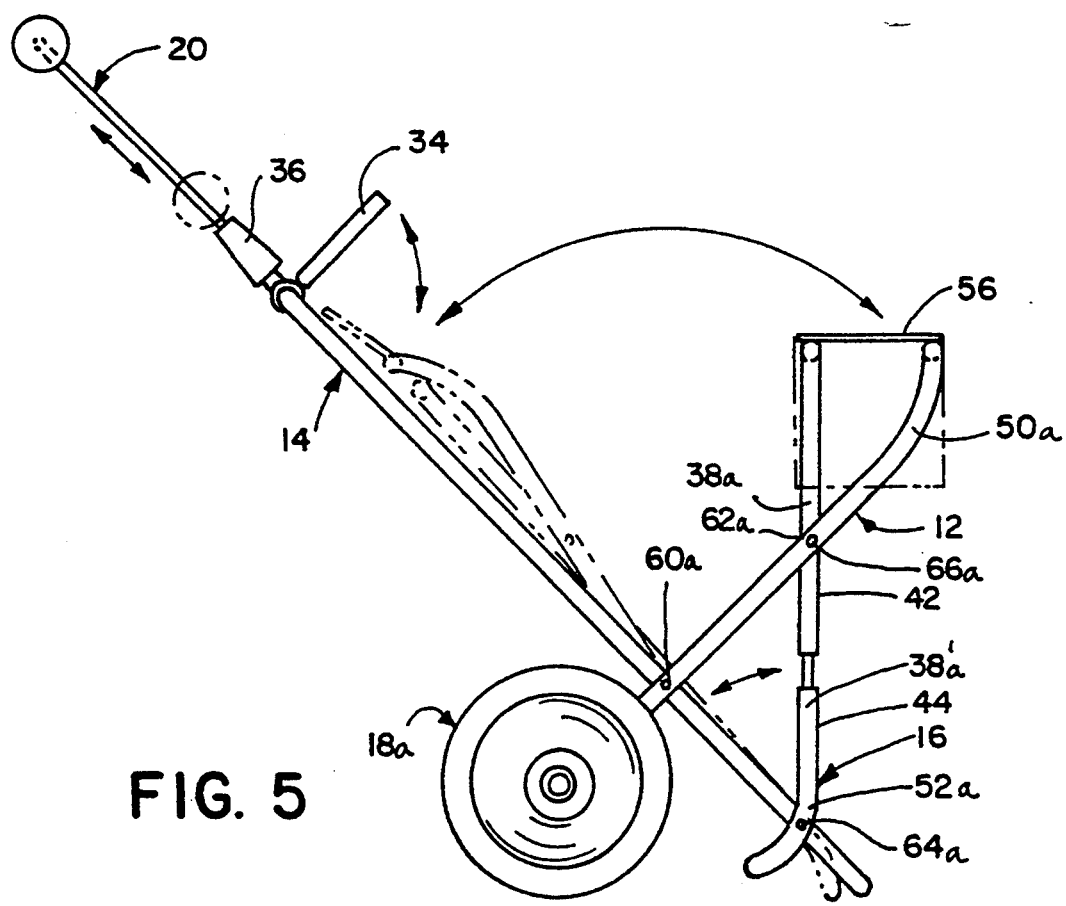
FIG. 5 is a side plan view of the cart showing the collapsed positions in phantom lines.

As best shown in FIGS. 4 and 5, a central portion of each wheel support frame side member 22a-b is pivotally secured to a central portion of the corresponding bag support frame side member 28a-b to form a first set of joints or pivots points 60a-b. A pair of wheels 18a-b are detachably secured to the wheel support frame 12 at elbows 22a-b in any manner known in the art. A central portion of each upper side member 38a-b is pivotally secured to a central portion of each wheel support frame side member 22a-b to form a second set of joints or pivot points 62a-b, preferably at a point below bends 50a-b. Finally, a lower portion of each bag support frame side member 28a-b is pivotally secured to a lower portion of the corresponding lower side member 38a-b' to form a third set of joints or pivot points 64a-b, preferably at a point above bends 52a-b.

Figure 3:
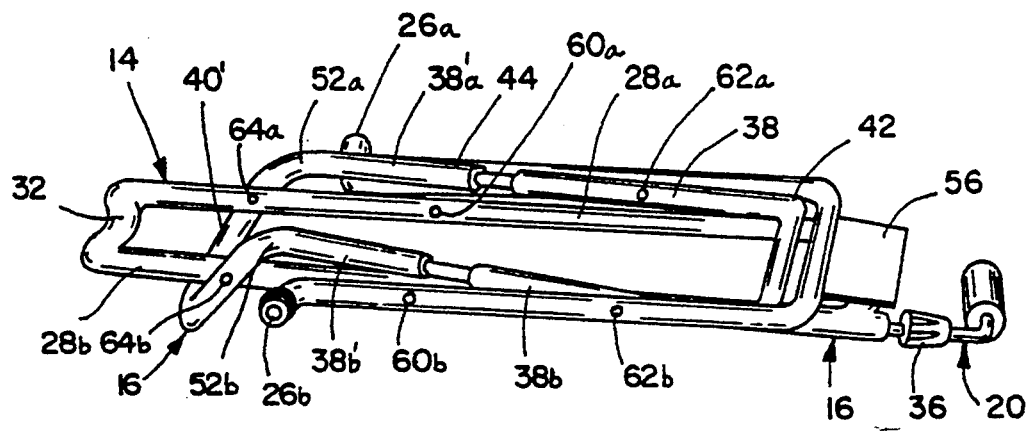
FIG. 3 is a perspective view of the golf bag cart collapsed.

In operation, the golf bag cart 10 is easily moved or transferred between collapsed and uncollapsed positions or configurations (See FIGS. 2 and 3) by pivoting wheel support frame 12 and bag support frame 14 relative to one another at the first set of joints 60a-b. In the uncollapsed position, the cart 10 supports a golf club bag 70, which is seated down between the bag support frame side members 28a-b with its bottom resting upon the bag support frame lower cross member 32. The upper portion of the bag 70 is supported by bag support member 34. The lower portion of the bag 70 is supported by the seat support frame lower cross member 40'. In this manner, the bag 70 is securely supported within the cart 10 without the need for additional securing means, such as a bag strap.

In order to collapse the cart 10, the upper portion of the bag support frame 14 is drawn toward the upper portion of the wheel support frame 12 thereby pivoting frames 12 and 14 at the first set of joints 60a-b in a scissor-like fashion. This single pivoting motion causes the seat support frame 16 to pivot in relation to the wheel support frame 12 at the second set of joints 62a-b' and in relation to the bag support frame 14 at the third set of joints 64a-b. Simultaneously, the upper and lower "U" shaped members 42 and 44 are drawn apart to telescopically extend the seat support frame 16. For a more compact profile, seat 54 and lid 56 can be folded upward and wheels 18a-b can be detached from the cart 10 at elbows 26a-b. In addition, the bag support member 34 can be rotated downward to lie parallel to the bag support frame side members 28a-b.

The cart 10 is uncollapsed by performing the reverse motion. The upper portion of the bag support frame 14 is drawn away from the upper portion of the wheel support frame 12 such that the two frames 12 and 14 pivot at the first set of joints 60a-b. This pivoting motion causes the seat support frame 16 to pivot in relation to the wheel support frame 12 at the second set of joints 62a-b and in relation to the bag support frame 14 at the third set of joints 64a-b. Simultaneously, the lower "U" shaped member 44 telescopes within the upper "U" shaped member 42 until the lower side members 38a-b' abut with rivets 66a-b at joints 62a-b (See FIG. 5). The bag support member 34 is rotated upward to lock into a position to receive and support the upper side wall of the golf club bag 70.

As discussed above, handle 20 is adjustable by operation of locking nut 36. By loosening locking nut 36, the handle 20 can be extended to a desired length and/or rotated to any desired angle. The handle 20 can be secured in the desired position by tightening locking nut 36.

The above description is that of a preferred embodiment of the invention. Various alterations and changes can be made without departing from the spirit and broader aspects of the invention as defined in the claims, which are to be interpreted in accordance with the principles of patent law, including the doctrine of equivalents.

The embodiments of the invention in which an exclusive property or privilege is claimed are defined as follows:

1. A collapsible golf club bag cart movable between collapsed and uncollapsed configurations, said cart comprising:
   a wheel support frame;
   a bag support frame having dual spaced apart side members for seating a golf club bag therebetween, said bag support frame being pivotally secured to said wheel support frame;
   a seat support frame pivotally secured to both said wheel support frame and said bag support frame, said seat support frame including at least one telescoping side member which extends or retracts as said cart is being collapsed or uncollapsed, respectively;
   a seat hingedly affixed to said wheel support frame and movable between a collapsed position and an uncollapsed position resting on said seat support frame; and
   a pair of wheels secured to said wheel support frame.

2. The collapsible golf club bag cart of claim 1, further comprising a handle secured to said bag support frame.

3. The collapsible golf club bag cart of claim 2, further comprising a container suspended below said seat.

4. The collapsible golf club bag cart of claim 3, wherein said seat is hingedly affixed to said wheel support frame such that said seat can be opened to provide access to the interior of said container.

5. The collapsible golf club bag cart of claim 4, further comprising a bag support member pivotal between a first collapsed position and a second extended position secured to said bag support frame.

6. The collapsible golf club bag cart of claim 5, wherein said wheels are detachable from said wheel support frame.

7. A collapsible golf club bag cart for supporting and carrying a golf club bag, comprising:

a wheel support frame having upper, lower and central portions, said lower portion of said wheel support frame supported upon a pair of wheels;

a bag support frame having upper, lower and central portions, said central portion of said bag support being pivotally secured to said central portion of said wheel support frame at a first position, said bag support frame including dual spaced apart side members; and a variable length seat support frame having upper, lower and central portions, said central portion of said seat support pivotally secured to said central portion of said wheel support frame at a second position and said lower portion of said seat support frame pivotally secured to said lower portions of said bag support frame at a third position;

wherein the golf club bag is positioned upon said cart between said dual spaced apart side members and is supported by said bag support frame and said seat support frame.

8. The collapsible golf club bag cart of claim 7, further comprising a seat affixed to said upper portion of said wheel support frame.

9. The collapsible golf club bag cart of claim 8, wherein said central portion of said variable length seat support frame is further defined as at least one telescoping side member.

10. The collapsible golf club bag cart of claim 9, wherein said telescoping side member is comprised of an upper section and a lower section, one of said upper and said lower sections slidably receiving the other of said upper and said lower sections whereby said telescoping side member is extended by drawing apart said upper and said lower sections, and said telescoping side member is retracted by forcing together said upper and said lower sections.

11. The collapsible golf club bag cart of claim 10, further comprising a handle affixed to said bag support frame.

12. The collapsible golf club bag cart of claim 11, wherein said wheels are detachable from said wheel support frame.

13. The collapsible golf club bag cart of claim 12, farther comprising a container suspended below said seat.

14. The collapsible golf club bag cart of claim 13, wherein said seat is hingedly affixed to said upper portion of said wheel support frame such that said seat can be opened to provide access to the interior of said container.

15. The collapsible golf club bag cart of claim 14, wherein said container includes a cooler means.

16. A collapsible golf bag cart bag for supporting and carrying a golf club bag, comprising;

a wheel support frame including a seat member and pair of spaced apart side members, each of said side members having upper, lower and central portions, said seat member extending across said upper portions of said pair of wheel support frame side members;

a bag support frame including a pair of spaced apart side members each having upper, lower and central portions, said bag support frame further including an upper cross member extending across said upper portions of said pair of bag support frame side members and a lower cross member extending across said lower portions of said pair of bag support frame side members, said central portion of said bag support side members being pivotally secured to said central portion of said wheel support side members;

a seat support frame including a pair of spaced apart upper side members, a pair of spaced apart lower side members, an upper cross member extending between said upper side members, and a lower cross member extending between said lower side members, said upper side members and said lower side members telescopically secured to each other, each of said upper side members pivotally secured to said wheel support frame side members, each of said lower side members pivotally secured to said lower portion of said bag support frame side members;

a handle affixed to said bag support frame; and a pair of wheels affixed to said lower portions of said wheel support frame side members.

17. The collapsing golf club bag cart of claim 16, further comprising a seat affixed to said wheel support frame.

18. The collapsing golf club bag cart of claim 17, further comprising a container suspended below said seat, said seat further defined as hingedly secured to said wheel support frame such that said seat can be opened to provide access to the interior of said container.

19. The collapsing golf club bag cart of claim 18, further comprising a bag support member pivotally secured to said upper cross member of said bag support frame, said bag support member pivotal between a first collapsed position and a second extended position.

* * * * *